US011715461B2

United States Patent
Haidar et al.

(10) Patent No.: US 11,715,461 B2
(45) Date of Patent: Aug. 1, 2023

(54) TRANSFORMER-BASED AUTOMATIC SPEECH RECOGNITION SYSTEM INCORPORATING TIME-REDUCTION LAYER

(71) Applicants: Md Akmal Haidar, Montreal (CA); Chao Xing, Montreal (CA)

(72) Inventors: Md Akmal Haidar, Montreal (CA); Chao Xing, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 279 days.

(21) Appl. No.: 17/076,794

(22) Filed: Oct. 21, 2020

(65) Prior Publication Data

US 2022/0122590 A1    Apr. 21, 2022

(51) Int. Cl.
    *G10L 15/16*    (2006.01)
    *G10L 15/06*    (2013.01)

(52) U.S. Cl.
    CPC ............ *G10L 15/16* (2013.01); *G10L 15/063* (2013.01)

(58) Field of Classification Search
    CPC ..... G10L 15/16; G10L 15/063; G10L 15/183; G10L 15/02; G06N 3/0454; G06N 3/084; H04R 3/005
    See application file for complete search history.

(56) References Cited

U.S. PATENT DOCUMENTS

| | | | | |
|---|---|---|---|---|
| 9,799,327 | B1 * | 10/2017 | Chan | G10L 15/183 |
| 10,923,111 | B1 * | 2/2021 | Fan | G10L 15/16 |
| 11,562,745 | B2 * | 1/2023 | Gaur | G10L 15/16 |

(Continued)

FOREIGN PATENT DOCUMENTS

| | | |
|---|---|---|
| CN | 109697974 A | 4/2019 |
| CN | 110188360 A | 8/2019 |

(Continued)

OTHER PUBLICATIONS

Niko Moritz, Takaaki Hori, Jonathan Le Roux, "Streaming Automatic Speech Recognition With the Transformer Model", arXiv preprint arXiv:abs:2001.02674v5 [cs.SD], Jun. 30, 2020. (Year: 2020).*

(Continued)

*Primary Examiner* — Richemond Dorvil
*Assistant Examiner* — Nadira Sultana

(57) ABSTRACT

Computer implemented method and system for automatic speech recognition. A first speech sequence is processed, using a time reduction operation of an encoder NN, into a second speech sequence comprising a second set of speech frame feature vectors that each concatenate information from a respective plurality of speech frame feature vectors included in the first set and includes fewer speech frame feature vectors than the first speech sequence. The second speech sequence is transformed, using a self-attention operation of the encoder NN, into a third speech sequence comprising a third set of speech frame feature vectors. The third speech sequence is processed using a probability operation of the encoder NN, to predict a sequence of first labels corresponding to the third set of speech frame feature vectors, and using a decoder NN to predict a sequence of second labels corresponding to the third set of speech frame feature vectors.

15 Claims, 9 Drawing Sheets

(56) References Cited

U.S. PATENT DOCUMENTS

| | | | | |
|---|---|---|---|---|
| 2015/0095026 A1* | 4/2015 | Bisani | ............... | H04R 3/005 |
| | | | | 704/232 |
| 2018/0174576 A1* | 6/2018 | Soltau | ............... | G10L 15/02 |
| 2019/0057683 A1* | 2/2019 | Sak | ............... | G06N 3/084 |
| 2019/0236451 A1* | 8/2019 | Jaitly | ............... | G10L 15/02 |
| 2020/0043467 A1 | 2/2020 | Qian et al. | | |
| 2020/0118547 A1 | 4/2020 | Weng et al. | | |
| 2020/0349922 A1* | 11/2020 | Peyser | ............... | G06F 40/279 |
| 2020/0357388 A1* | 11/2020 | Zhao | ............... | G10L 15/183 |
| 2020/0365138 A1* | 11/2020 | Kim | ............... | G06F 3/167 |
| 2021/0141799 A1* | 5/2021 | Steedman Henderson | ............... | |
| | | | | G06F 16/24578 |
| 2022/0115006 A1* | 4/2022 | Hori | ............... | G10L 15/07 |

FOREIGN PATENT DOCUMENTS

| | | |
|---|---|---|
| CN | 110428818 A | 11/2019 |
| CN | 111009237 A | 4/2020 |

OTHER PUBLICATIONS

S. Karita et al. A Comparative Study on Transformer vs RNN in Speech Applications, Asru 2019.

K. Irie et al., On the Choice of Modeling Unit for Sequence-to-Sequence Speech Recognition, INTERSPEECH 2019.

Y. Wang et al, Transformer-Based Acoustic Modeling for Hybrid Speech Recognition, ICASSP 2020.

W. Chan et al, Listen, Attend and Spell, ICASSP 2016.

W. Chan et al, Speech recognition with attention-based recurrent neural networks, 2016 https://patents.google.com/patent/US9799327B1/en.

V. Panayotov et. al, Librispeech: An ASR corpus based on public domain audio books, ICASSP 2015.

N. Moritz et. al, Streaming Automatic Speech Recognition With The Transformer Model, ICASSP 2020.

A. Graves et al, Connectionist temporal classification: Labelling unsegmented sequence data with recurrent neural networks, in ICML, 2006.

T. Kudo et al, SentencePiece: A simple and language independent subword tokenizer and detokenizer for neural text processing, in EMNLP 2018.

C. Wang et al, Semantic Mask for transformer based end-to-end speech recognition, https://arxiv.org/abs/1912.03010 2020.

C. Wang et al, Low Latency End-to-End Streaming Speech Recognition with a Scout Network, https://arxiv.org/abs/2003.10369 2020.

M. McAuliffe et al., Montreal forced aligner: Trainable text-speech alignment using kaldi. in Interspeech 2017.

* cited by examiner

TRANSFORMER-BASED AUTOMATIC SPEECH RECOGNITION SYSTEM INCORPORATING TIME-REDUCTION LAYER

CROSS-REFERENCE TO RELATED APPLICATIONS

N/A

FIELD

This disclosure relates to automatic speech recognition using neural networks.

BACKGROUND

End-to-end Automatic speech recognition (ASR) systems have been growing in prominence because they rely on relatively simple training and inference procedures compared to traditional hidden Markov model (HMM) based systems. One such ASR system employs a transformer architecture, which uses multi-head self-attention to model temporal context information. Such an ASR system is generally referred to as a transform-based ASR system. A transformer-based ASR system performs ASR on a sequence of frame-level acoustic features of an audio file. A transformer-based ASR includes a transformer encoder a transformer decoder, each of which is implemented using a respective set of neural network layers. The transformer encoder receives as input a sequence of frame-level acoustic features $(x1, \ldots, xT)$, and maps the sequence of frame-level acoustic features to a sequence of high-level representations $(h1, \ldots, hN)$. The decoder generates a transcription of the audio file $(y1, \ldots, yL)$ one token (word-level tokens or sub-word units, such as such as characters produced through byte pair encoding, or sentence piece) at a time. Each token yl is conditioned on the representations $(h1, \ldots, hN)$ and previously generated tokens $(y1, \ldots, yl-1)$ through attention mechanisms. A ground truth transcription of the audio file (i.e. the target transcription or target sequence) is represented by word-level tokens or sub-word units such as characters produced through byte pair encoding, or sentence piece. Transformer based ASR systems have been shown to achieve significantly lower word error rates (WERs) compared to recurrent neural network (RNN) based system architectures. An example of such a transformer based ASR system is described in S. Karita et al. A COMPARATIVE STUDY ON TRANSFORMER VS RNN IN SPEECH APPLICATIONS, ASRU 2019, arXiv:1909.06317v2 [cs.CL] 28 Sep. 2019.

The self-attention mechanism applies attention matrices on the sequence of frame-level acoustic feature to learn time-dependency inside the input sequence of frame-level acoustic features. Applying self-attention to speech recognition is challenging because individual speech frames that contain acoustic features are not like lexical units such as words. Individual speech frames do not convey distinct meanings, which can make it challenging for automated self-attention mechanisms to compute proper attentive weights. Transformer based ASR systems suffer from decreasing computing efficiency and learn longer but meaningless dependencies for longer input sequences.

Accordingly, there is a need for improvements in transformer based ASR systems.

SUMMARY

The present disclosure provides a transformer-based ASR system that can optimize computing efficiency and enrich the input feature-level acoustic features for longer sequences of frame-level acoustic features input to a transformer-based ASR system, and a method of performing ASR using the transformer-based ASR system.

According to a first example aspect of the disclosure is a computer implemented method for automatic speech recognition, including: obtaining a first speech sequence that comprises a first set of speech frame feature vectors that each represent a respective speech frame that corresponds to a respective time step; processing the first speech sequence, using a time reduction operation of an encoder NN, into a second speech sequence that comprises a second set of speech frame feature vectors that each concatenate information from a respective plurality of the speech frame feature vectors included in the first set, wherein the second speech sequence includes fewer speech frame feature vectors than the first speech sequence; transforming the second speech sequence, using a self-attention operation of the encoder NN, into a third speech sequence that comprises a third set of speech frame feature vectors; processing the third speech sequence, using a probability operation of the encoder NN, to predict a sequence of first labels corresponding to the third set of speech frame feature vectors; and processing the third speech sequence using a decoder NN to predict a sequence of second labels corresponding to the third set of speech frame feature vectors.

In at least some scenarios, apply the time reduction operation prior to the self-attention operation can reduce the number of computing operations that need to be performed by the self-attention operation.

In at least some examples of the preceding aspect, the method includes, during a training stage of the encoder NN and the decoder NN: computing a loss function based on the predicted sequence of first labels and the predicted sequence of second labels; performing back propagation using gradient decent to update learnable parameters of the decoder NN and the encoder NN to reduce the loss function.

In at least some examples of one or more of the preceding aspects, the method incudes, during an inference stage, computing a sequence of labels for the third speech sequence based on the predicted sequence of first labels and the predicted sequence of second labels.

In at least some examples of one or more of the preceding aspects, obtaining an input speech sequence that comprises an input set of speech frame feature vectors that each represent a respective speech frame that corresponds to a respective time step; and processing the input speech sequence, using a subsampling operation of the encoder NN, into the first speech sequence, wherein the first speech sequence includes fewer speech frame feature vectors than the input speech sequence.

In at least some examples of one or more of the preceding aspects, the time reduction operation is performed using one or more linear NN layers of the encoder NN.

In at least some examples of one or more of the preceding aspects, obtaining the first speech sequence includes: obtaining an initial speech sequence that comprises an initial set of speech frame feature vectors that each represent a respective speech frame that corresponds to a respective time step; and processing the first speech sequence, using a further self-attention operation of the encoder NN that precedes the time reduction operation, into the first speech sequence.

In at least some examples of one or more of the preceding aspects, obtaining the initial speech sequence comprises: obtaining an input speech sequence that comprises an input set of speech frame feature vectors that each represent a respective speech frame that corresponds to a respective time step; and processing the input speech sequence, using a subsampling operation of the encoder NN, into the initial speech sequence, wherein the initial speech sequence includes fewer speech frame feature vectors than the input speech sequence.

In at least some examples of one or more of the preceding aspects, the self-attention operation and the further self-attention operation are each performed by respective sub-networks of self-attention layers.

In at least some examples of one or more of the preceding aspects, the method incudes using a respective number of self-attention layers for each of the self-attention operation and the further self-attention operation based on obtained hyperparameters.

According to a further example aspect, an automatic speech recognition computing system is disclosed that includes: a storage storing executable instructions; and a processing device in communication with the storage. The processing device is configured to execute the instructions to cause the computing system to: obtain a first speech sequence that comprises a first set of speech frame feature vectors that each represent a respective speech frame that corresponds to a respective time step; process the first speech sequence, using a time reduction operation, into a second speech sequence that comprises a second set of speech frame feature vectors that each concatenate information from a respective plurality of the speech frame feature vectors included in the first set, wherein the second speech sequence includes fewer speech frame feature vectors than the first speech sequence; transform the second speech sequence, using a self-attention operation, into a third speech sequence that comprises a third set of speech frame feature vectors; process the third speech sequence, using a probability operation, to predict a sequence of first labels corresponding to the third set of speech frame feature vectors; and process the third speech sequence using a further self-attention operation and a further probability operation to predict a sequence of second labels corresponding to the third set of speech frame feature vectors.

In some example embodiments of the system, the processing device is configured to execute the instructions to cause the computing system to implement a encoder neural network (NN) and a decoder NN, wherein the time reduction operation, self-attention operation and probability operation are each performed using respective sub-networks of the encoder NN and the further self-attention operation and further probability operation are each performed using respective sub-networks of the decoder NN.

According to a further example aspect is computer readable medium storing computer instructions that, when executed by a processing device of a computer system cause the computer system to: obtain a first speech sequence that comprises a first set of speech frame feature vectors that each represent a respective speech frame that corresponds to a respective time step; process the first speech sequence, using a time reduction operation of an encoder NN, into a second speech sequence that comprises a second set of speech frame feature vectors that each concatenate information from a respective plurality of the speech frame feature vectors included in the first set, wherein the second speech sequence includes fewer speech frame feature vectors than the first speech sequence; transform the second speech sequence, using a self-attention operation of the encoder NN, into a third speech sequence that comprises a third set of speech frame feature vectors; process the third speech sequence, using a probability operation of the encoder NN, to predict a sequence of first labels corresponding to the third set of speech frame feature vectors; and process the third speech sequence using a decoder NN to predict a sequence of second labels corresponding to the third set of speech frame feature vectors.

According to yet a further example aspect is an automated speech recognition system comprising: an encoder neural network that can obtain a first speech sequence that comprises a first set of speech frame feature vectors that each represent a respective speech frame that corresponds to a respective time step, the encoder neural network implementing: a time reduction operation transforming the first speech sequence into a second speech sequence that comprises a second set of speech frame feature vectors that each concatenate information from a respective plurality of the speech frame feature vectors included in the first set, wherein the second speech sequence includes fewer speech frame feature vectors than the first speech sequence; a self-attention operation transforming the second speech sequence, using a self-attention mechanism, into a third speech sequence that comprises a third set of speech frame feature vectors; a probability operation predicting a sequence of first labels corresponding to the third set of speech frame feature vectors. The system also comprises a decoder neural network processing the third speech sequence to predict a sequence of second labels corresponding to the third set of speech frame feature vectors.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Example embodiments will now be described more fully hereinafter with reference to the accompanying drawings, in which some, but not all, embodiments of the invention are shown. The features and aspects presented in this disclosure may be embodied in many different forms and should not be construed as limited to the embodiments set forth herein.

Where possible, any terms expressed in the singular form herein are meant to also include the plural form and vice versa, unless explicitly stated otherwise. In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

The present disclosure is directed to a transformer-based ASR system that may, in some applications, use fewer computing resources than known transformer-based ASR solutions, and/or improve prediction accuracy. For example, fewer computational operations and or/reduced system memory may be required to implement the transformer-based ASR system and methods disclosed in this document than required for previous solutions.

In at least some applications, the disclosed transformer-based ASR systems and methods may improve the performance of speech recognition by reducing the frame rate used at a sub-network of a transformer-based ASR system. In example embodiments, this is achieved by incorporating a time-reduction operation in additional to a convolutional sub-sampling operation performed on input speech frames. In some examples, computational costs for training the encoder and decoder of a transformer-based ASR system and for executing operations of the trained-transformer-based ASR system during inference may be reduced, while achieving accurate results for ASR. For example, computational cost may be reduced up to nk^2 times where k is a frame rate reduction ratio and n is the number of self-attention layers after the time reduction operation.

Figure 1:
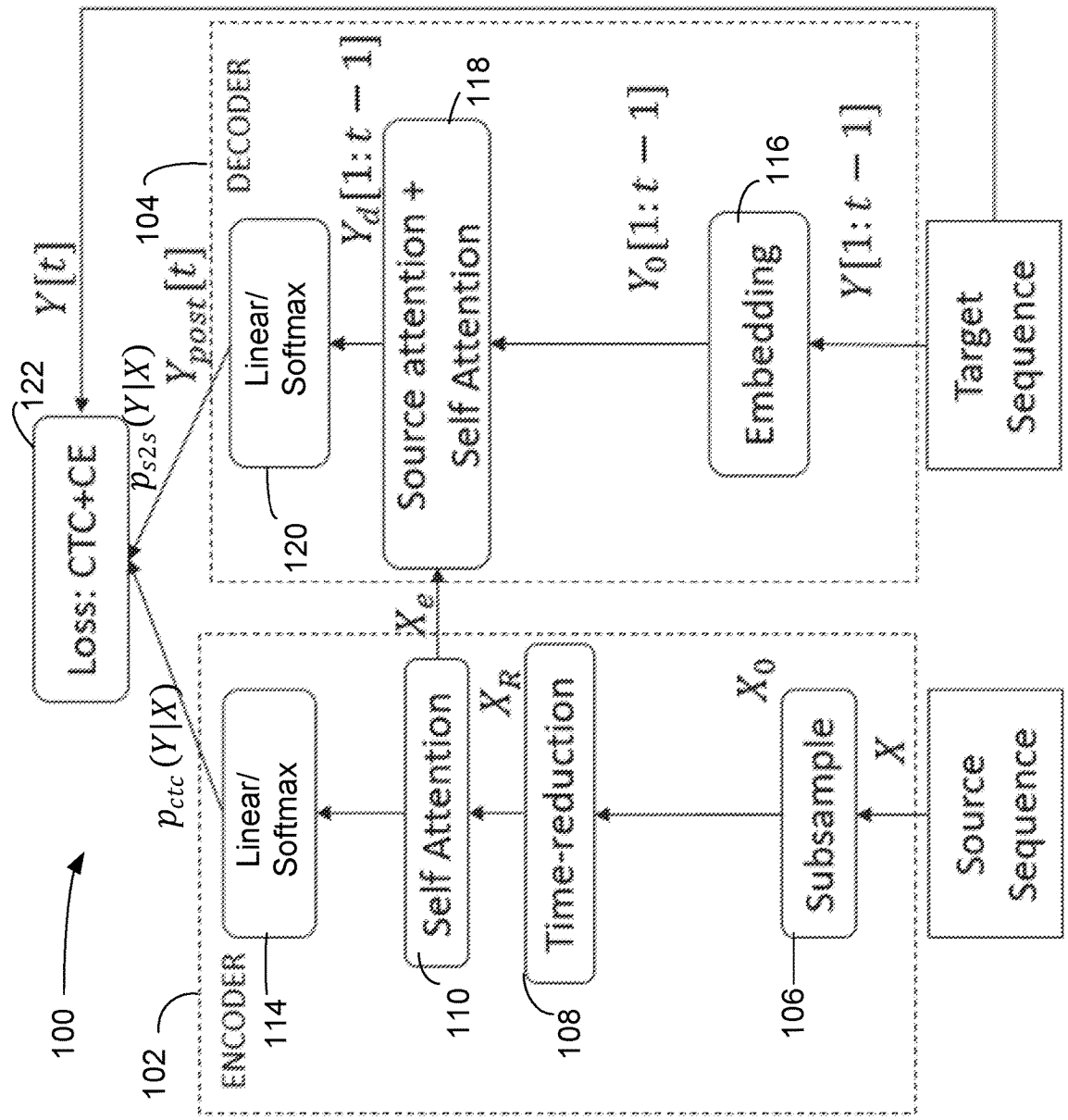
FIG. 1 is a block diagram showing a structure of an automatic speech recognition (ASR) system according to example embodiments.

FIG. 1 is a block diagram illustrating a transformer-based, end-to-end, ASR system 100 according to example embodiments. As used here, end-to-end can refer to a system in which the learnable neural network parameters for the system can be learned simultaneously for all neural networks and neural network layers from system input to output during system training. As used in the disclosure, "learned" can refer to an operation or value that has been adjusted during training of a neural network.

Transformer-based ASR system 100 receives an audio input in the form of an acoustic source sequence X that represents a spoken utterance and predicts a corresponding sequence (i.e. transcription) Y of graphemes, characters, words or sentence pieces that represents the utterance. The acoustic source sequence X includes a sequence of speech frames, each of which is represented as a respective speech frame feature vector: $X=[x_1, \ldots, x_T]$ (i.e., a sequence of frame-level acoustic features). In example embodiments, each speech frame feature vector $x_1, \ldots, x_T$ includes a set of elements that embed information that represents its corresponding speech frame, and each speech frame corresponds to a time-step. In example embodiments, $d_{att}$ is the number of elements (i.e, dimensions) included in each speech frame feature vector. For example, the elements included in each speech frame feature vector $x_1, \ldots, x_T$ can collectively represent the power spectral envelope of its corresponding speech frame. Each speech frame has the same pre-defined duration (for example a 10 ms or a 15 ms time-step duration, by way of non-limiting example). In example embodiments, each speech frame feature vector $x_i$ (where i is a source frame index, $1 \leq i \leq T$) is a log Mel filterbank feature vector comprising a set of $d_{att}$ elements known as log Mel Frequency Cepstral Coefficients (MFCCs).

The number of source speech frames that are included in acoustic source sequence X is generally much greater than the number of text characters or sentence pieces included in target sequence Y (i.e., target transcription). For example, a target sequence Y corresponding to a long utterance of fifteen seconds could include 150 text characters (e.g., 30 words with an average of 5 characters each), which would be predicted based on 1500 speech frames (assuming 10 ms per frame). Accordingly, frame rate reduction is an important aspect for successful training of transformer-based ASR system 100.

The transformer-based ASR system 100 includes two neural networks (NNs), an encoder NN 102 and a decoder NN 104. During training, both the encoder NN 102 and the decoder NN 104 predict the frame-wise posterior distribution of a target sequence Y given a corresponding acoustic source sequence X, namely $p_{ctc}(Y|X)$ and $p_{s2s}(Y|X)$, respectively.

The encoder NN 102 includes a plurality of layers, with groups of successive layers forming NN sub-networks that perform respective task-specific operations. In FIG. 1, the task-specific operations that are implemented by NN sub-networks of the encoder NN 102 include: subsample operation 106, time-reduction operation 108, self-attention operations 110, and a linear/softmax probability operation 114. The decoder NN 104 also includes a plurality of layers forming NN sub-networks that perform respective task-specific operations. The task-specific operations that are implemented by respective NN sub-networks of the decoder NN 102 include: embedding operation 116, source attention+self-attention operation 118 and linear/softmax probability operation 120. These operations will now be explained in greater detail below.

Figure 2:
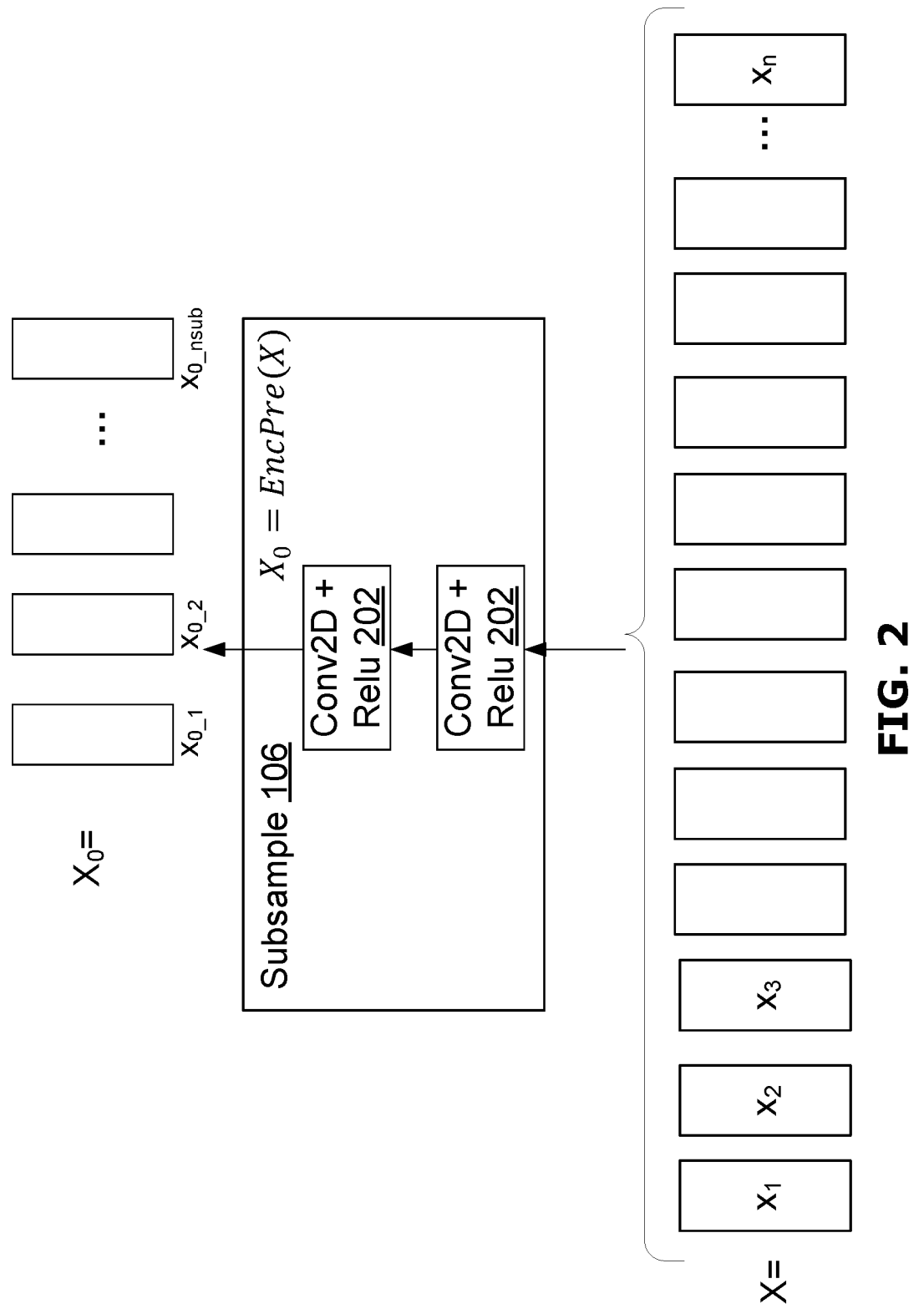
FIG. 2 is a block diagram illustrating a subsampling operation of the ASR system of FIG. 1 according to an example embodiment.

The subsample operation 106 of encoder NN 102 functions as a preprocessing mechanism that is configured to use convolution to capture the embedding for a group of source speech frames by applying frame stacking and frame skipping techniques, an example of which is illustrated in FIG. 2, to reduce the frame rate of the input sequence X. Combining information from multiple source speech frames may in some cases form transformed frames that represent units like phonemes more meaningfully when compared to the source speech frames. In an example embodiment, subsample operation 106 applies a convolution based approach for frame-rate reduction such as described in: Y. Wang et. Al, TRANSFORMER-BASED ACOUSTIC MODELING FOR HYBRID SPEECH RECOGNITION, ICASSP 2020, arXiv:1910.09799v2 [cs.CL] 30 Apr. 2020.

In an example embodiment, subsample operation 106 can be represented by equation (1) as follows:

$$X_0 = \text{EncPre}(X) \quad (1)$$

In an example embodiment, the EncPre(X) subsample operation 106 transforms the acoustic source sequence X into a subsample sequence $X_0 \in R^{n_{sub} \times d_{att}}$ by using a sub-network that includes two convolution neural network (CNN) blocks 202 that each have stride size=2 and kernel size=3, which collectively reduce the frame rate of output sequence $X_0$ by a factor of 4 compared to the source speech frame rate of X ($n_{sub}$ is the number of frame feature vectors of the output sequence $X_0$, and $d_{att}$ is the number of elements in each frame feature vector). The CNN blocks 202 each include a CNN layer and a Relu layer and are configured by respective sets of learnable parameters, including weight matrices and bias vectors, that are learned during end-to-end training of the transformer-based ASR system 100.

In example embodiments, time-reduction operation 108 is included to apply a further frame rate reduction using a different frame rate reduction technique then that applied by subsample operation 106. In example embodiments, time-reduction operation 108 is configured to concatenate adjacent frames in the subsample sequence $X_O$ to output further time reduced sequence $X_R \in \mathbb{R}^{n_{sub2} \times d_{att}}$, where $n_{sub2}$ is the length in frames (e.g., number of output frame feature vectors) of the output sequence $X_R$, and $n_{sub2} < n_{sub}$.

Figure 3:
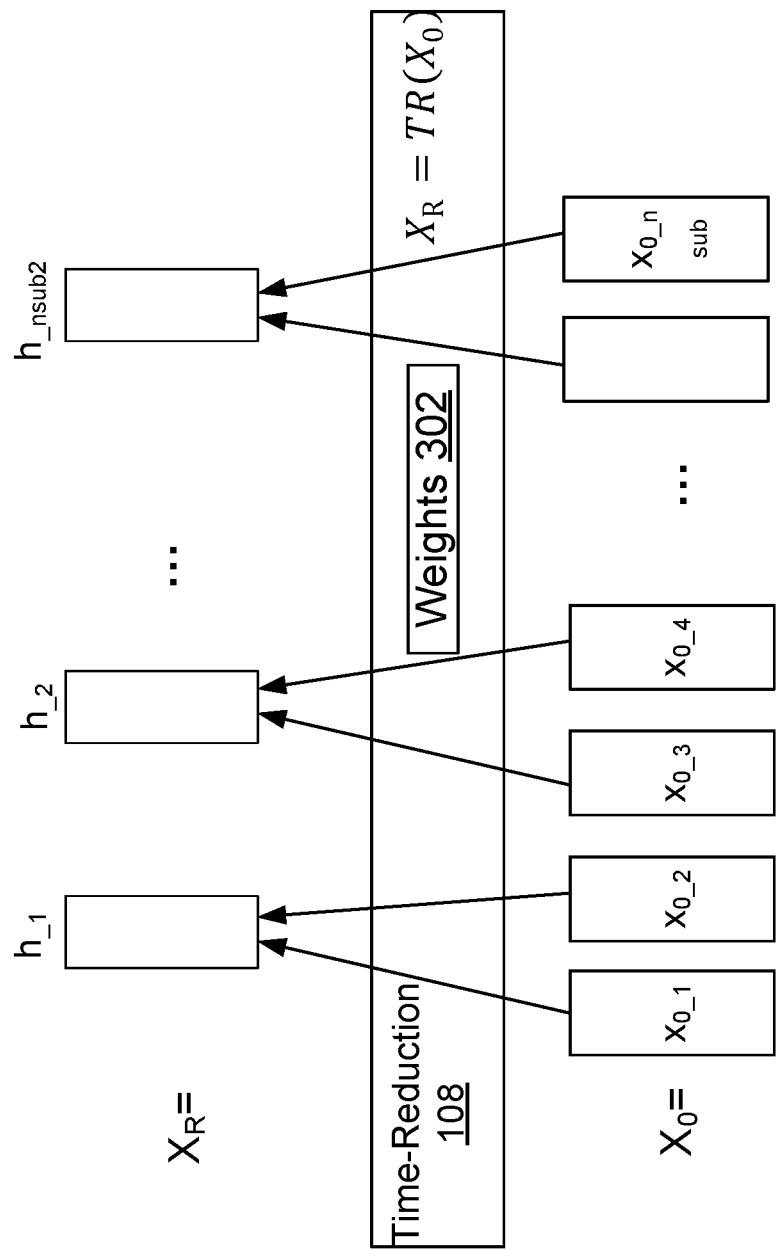
FIG. 3 is a block diagram illustrating a time-reduction operation of the ASR system of FIG. 1 according to an example embodiment.

FIG. 3 shows an example of a time-reduction operation 108, represented by equation (2):

$$X_R = TR(X_O) \quad (2)$$

In example embodiments, the time-reduction operation 108 is implemented using at least one linear NN layer of encoder NN 102 that applies a learned linear transformation to the sequence $X_O = (x_{O_1}, x_{O_2}, \ldots, x_{O_{n_{sub}}})$ to generate time-reduced sequence $X_R = (h_1, h_2, \ldots, h_{n_{sub2}})$. In one example, time-reduction operation 108 concatenates two or more frames (e.g., speech feature vectors) from sequence $X_O$ into a respective frame (e.g. speech feature vector) based on learned weight matrix 302. In an example embodiments, the time resolution may be reduced by a factor of k, where k is the number of frames concatenated. For example, the time resolution may be reduced $k=2^l$ times, where l is the number of layers in time-reduction operation 108. The time reduced sequence $X_R$ generated by time-reduction operation for the subsample sequence $X_O$ has a reduced length, i.e., $n_{sub2} < n_{sub}$. In example embodiments, the number/of layers can be a hyperparameter. In an example embodiment where l=1 and k=2, When k=2, an example of TR for j-th layer at the output of i-th time step can be described by the following equation (4):

$$h_i^j = [h_{2i}^{j-1}, h_{i+1}^{j-1}] \quad (4)$$

The NN layer(s) of time-reduction operation 108 are configured by respective sets of learnable parameters, including weight matrices 302 and bias vectors, that are learned during end-to-end training of the ASR system 100. In various example embodiments, the calculation of $h_i^j$ in a layer of time-reduction operation 108 is not limited to only concatenation of consecutive steps. It can be any technique such as attention, concatenation, dense combination etc. which reduces the time steps in the transformer layers.

As indicated previously, a transformer-based ASR system receives as input a sequence of frame-level feature vectors and maps the sequence of frame-level feature vectors to a sequence of high-level feature vector representations. The decoder generates a transcription sequence (y1, . . . , yL) one token at a time. Each token yl is conditioned on the high-level feature vector representations and previously generated tokens (y1, . . . , yl−1) through attention mechanisms. In this regard, the encoder NN 102 includes a further set of layers that from a sub-network for performing self-attention operation 110. Self-attention operation 110 includes one or more self-attention mechanisms that transform the time reduced sequence $X_R$ into a further sequence $X_e \in \mathbb{R}^{n_{sub2} \times d_{att}}$ of higher level encoded feature vectors as represented by the following equation (5):

$$X_e = EncBody(X_R) \quad (5)$$

Where e is the number of NN layers included in self-attention operation 110.

In example embodiments, the self-attention operation 110 can be implemented using techniques described in: S. Karita et al., A COMPARATIVE STUDY ON TRANSFORMER VS RNN IN SPEECH APPLICATIONS, ASRU 2019, arXiv:1909.06317v2 [cs.CL] 28 Sep. 2019.

In this regard, self-attention operation 110 is configured to learn sequential information using a self-attention mechanism. By way of context, a dot-attention layer can be defined by the following equation (6):

$$att(X^q, X^k, X^v) = \text{softmax}\left(\frac{X^q X^{kT}}{\sqrt{d^{att}}}\right) X^v \quad (6)$$

where $X_k, X^v \in \mathbb{R}^{n^k \times d_{att}}$, and $X^q \in \mathbb{R}^{n^q \times d_{att}}$ are inputs for the attention layer, $d_{att}$ is the number of feature dimensions, $n^q$ is the length of $X^q$, and $n^k$ is the length of $X^k$. In example embodiments, q is equal to k.

In this disclosure, $X^q X^{kT}$ is referred to as the "attention matrix". The input $X^q$ can be considered a query and the inputs $X^k$ and $X^v$ a set of key-value pairs.

The layer represented by equation (6) can be extended to a multi-head attention (MHA) deal with multiple attentions in parallel, as indicate in equations (7) and (8) below:

$$MHA(Q,K,V) = [H_1, H_2, \ldots, H_{d^{head}}] W^{head} \quad (7)$$

$$H_h = att(QW_{b,h}^q, KW_{h,1}^k V W_h^v) \quad (8)$$

where $K, V \in \mathbb{R}^{n^k \times d_{att}}$ and $Q \in \mathbb{R}^{n^q \times d_{att}}$ are inputs for the MHA layer, $H_h \in \mathbb{R}^{n^q \times d_{att}}$ is the h-th self-attention layer output (h=1, . . . , $d^{head}$) $W_h^q$, $W_h^k$, $W_h^v \in \mathbb{R}^{d_{att} \times d_{att}}$, and $W^{head} \in \mathbb{R}^{d_{att} d_{head} \times d_{att}}$ are learnable weight matrices and $d^{head}$ is the number of self-attentions operations 110 performed by the MHA layer.

In an illustrative example, self-attention operation 110 ($X_e = EncBody(X_R)$) comprises e NN layers, and each NN layer can be defined as follows:

$$X_i^l = f(X_i + MHA_i(X_i, X_i, X_i)) \quad (9)$$

$$X_{i+1} = f(X_i^l + FF_i(X_i^l)) \quad (10),$$

where and i=0, . . . , e−1 is a layer index, f is the layer norm operation and $FF_i$ is the i-th two layer feedforward network:

$$FF(X[t]) = \text{ReLU}(X[t] W_1^{ff} + b_1^{ff}) W_2^{ff} + b_2^{ff} \quad (11),$$

where $X[t] \in \mathbb{R}^{d_{att}}$ is the t-th frame of the input sequence $X_R$, $W_1^{ff} \in \mathbb{R}^{d_{att} \times d_{ff}}$, $W_2^{ff} \in \mathbb{R}^{d_{ff} \times d_{att}}$ are learnable weight matrices, and $b_1^{ff} \in \mathbb{R}^{d_{ff}}$, $b_2^{ff} \in \mathbb{R}^{d_{att}}$ are learnable bias vectors. The component $MHA_i(X_i, X_i, X_i)$ in equation (10) can be referred to as "self-attention".

In example embodiments, linear/softmax probability operation 114 is performed by a linear layer followed by a softmax layer. The linear layer applies a learned linear transformation to the high-level sequence $X_e$ generated by the self-attention operation 110 in order to project the high-level sequence $X_e$ the appropriate space for processing by the softmax layer. The softmax layer then applies a softmax function over the outputs of the linear layer to generate the probability distribution over the possible network outputs (e.g. probabilities for all possible tokens (also known as labels). Thus, encoder NN 102 ouputs a frame-wise posterior distribution of target sequence Y (i.e., $p_{ctc}(Y|X)$). In example embodiments, linear/softmax probability operation 114 is configured to generate connectionist temporal classification (CTC) outputs and scoring values.

In example embodiments, the decoder NN 104 is implemented using a decoder structure as described in the above-mentioned document: S. Karita et al., A COMPARATIVE STUDY ON TRANSFORMER VS RNN IN SPEECH APPLICATIONS, ASRU 2019, arXiv:1909.06317v2 [cs.CL] 28 Sep. 2019.

As noted above, the task-specific operations that are implemented by respective NN sub-networks of the decoder NN 102 include: embedding operation 116, source attention+self-attention operation 118 and cross-entropy (CE) operation 120.

Embedding operation 116 can be represented by equation (12):

$$Y_0[1\!:\!t\!-\!1] = \text{DecPre}(Y[1\!:\!t\!-\!1]) \tag{12}$$

Where t is a target frame index and Y[1:t−1] is the context of target Y[t].

Embedding operation 116 is configured to embed the tokens into a context sequence $Y_0[1\!:\!t\!-\!1]$ using known embedding techniques. For example, the tokens may be graphemes, characters, words or sentence pieces. The sub-network of NN layers that provide embedding operation 116 are configured by respective sets of learnable parameters, including weight matrices and bias vectors, that are learned during end-to-end training of the ASR system 100.

During the training stage of transformer-based ASR system 100, the decoder NN 104 input is a ground truth context sequence Y[1:t−1] of ground-truth labels that correspond to a transcription of the source sequence X. During the post-training inference stage, the decoder input is a target context sequence Y[1:t−1] that is the output generated by encoder network 102 and a start token s.

The source attention operation and self-attention operation 118, can be represented by $\text{MHA}_j^{src}(Y_j^I, X_e, X_e)$ and $\text{MHA}_j^{self}(Y_j[t], Y_j[1\!:\!t], Y_j[1\!:\!t])$ respectively, whose output can be represented as equation 13:

$$Y_d[t] = \text{DecBody}(X_e, Y_0[1\!:\!t\!-\!1]) \tag{13}$$

Where d is the number of NN layers included in source attention+self-attention operation 118.

In example embodiments, source attention+self-attention operation 118 ($\text{DecBody}(X_e, Y_0[1\!:\!t\!-\!1])$) is configured to generate a next target frame using the encoded sequence $X_e$ (generated by the self-attention operation 110) and the target context Y[1:t−1]. Source attention+self-attention operation 118 ($\text{DecBody}(X_e, Y_0[1\!:\!t\!-\!1])$) can be described by using two attention modules (self-attention and source attention), represented in the following equations:

$$Y_j[t]^I = Y_j[t] + \text{MHA}_j^{self}(Y_j[t], Y_j[1\!:\!t], Y_j[1\!:\!t]) \tag{14}$$

$$Y_j^{II} = Y_j^I + \text{MHA}_j^{src}(Y_j^I, X_e, X_e) \tag{15}$$

$$Y_{j+1} = Y_j^I + FF_j(Y_j^{II}) \tag{16}$$

Where j=0, . . . , d−1 is the index of the decoder layers. $\text{MHA}_j^{src}$ describes as encoder-decoder attention. For unidirectional sequence generation using decoder, the attention matrices at the t-th target frame are masked so that they do not connect with future frames later than t.

The linear CE operation 120 can be represented by equation (17)

$$Y_{post}[1\!:\!t] = \text{DecPost}(Y_d[1\!:\!t]) \tag{17}$$

Linear/softmax probability operation 120 ($\text{DecPost}(Y_d[1\!:\!t])$) is configured to predict the posterior distribution of the next token prediction $Y_{post}[1\!:\!t]$. In example embodiments, linear/softmax probability operation 120 is performed by a linear layer followed by a softmax layer. In example embodiments, linear/softmax probability operation 114 is configured to generate cross entropy (CE) outputs and scoring values.

Accordingly, the decoder NN 104 receives the encoded sequence $X_e$ and the target context sequence Y[1:t−1] of token IDs. First, embedding operation 116 (DecPre(.)) embeds the tokens into learnable vectors $Y_0[1\!:\!t\!-\!1]$. Then, source attention+self-attention operation (DecBody(.)) and liner/softmax operation 120 (DecPost(.)) predicts the posterior distribution of the next token prediction $Y_{post}[t]$ given $X_e$ and Y[1:t−1].

The NN subnetwork layers that form embedding operation 116, source attention+self-attention operation 118, and probability operation 120 each are configured by respective sets of learnable parameters, including weight matrices and bias vectors, that are learned during end-to-end training of ASR system 100.

In example embodiments, the transformer subnetworks of ASR system 100 (i.e., encoder self-attention operation 110 and decoder source attention+self-attention operation 118) do not include convolution layers or recurrent layers. Accordingly, position information in the input sequences provided to the encoder self-attention operation 110 and decoder source attention+self-attention operation 118 can be represented using sinusoidal positional encoding, as represented by equation 18:

$$PE[t] = \begin{cases} \sin\dfrac{t}{10000^{\frac{t}{d_{att}}}} & \text{if } t \text{ is even} \\ \cos\dfrac{t}{10000^{\frac{t}{d_{att}}}} & \text{if } t \text{ is odd} \end{cases} \tag{18}$$

Sequence $X_0$ and sequence $Y_0$ are concatenated with PE[1],PE[2], . . . ) before being applied to self-attention operation 110 and source attention+self-attention operation 118, respectively. In some example embodiments, subsampling operation 106 could alternatively apply VGG-like convolution subsampling, in which case positional encoding of Sequence $X_0$ is not required.

During training of the ASR system a "sequence-to-sequence" (S2S) frame-wise posterior distribution of target sequence Y (i.e., $p_{s2s}(Y|X)$ e.g.) is predicted by the decoder NN 104, and a connectionist temporal classification (CTC) frame-wise posterior distribution of target sequence Y (i.e., $p_{ctc}(Y|X)$) is predicted by the Linear/softmax operation 114 of the encoder NN 102. A loss based on CTC and CE, calculated by a loss function operation 122, of the training can be described as:

$$L_{ASR} = -\alpha \log p_{s2s}(Y|X) - (1-\alpha)\log p_{ctc}(Y|X) \tag{19}$$

Where α is a hyperparameter.

In at least some example embodiments, a post training inference stage (also referred to as a decoding stage), given the speech feature x and the previous predicted token, the next token is predicted using a beam search, which combines the scores of S2S (e.g. decoder NN 104 output), CTC (e.g., encoder NN 102 output) as well as the output of a trained RNN language model (lm):

$$\hat{Y} = \underset{Y \in y^*}{\operatorname{argmax}} \{\lambda \log p_{s2s}(Y|X_e) + (1-\lambda)\log p_{ctc}(Y|X_e) + \gamma \log p_{lm}(Y)\} \tag{20}$$

where $y^+$ is a set of hypotheses of the target is sequence Y, and λ, γ are hyperparameters. In such examples, the RNN lm may be implemented using known architecture and training techniques. In some examples, the RNN lm may be omitted.

Figure 4:
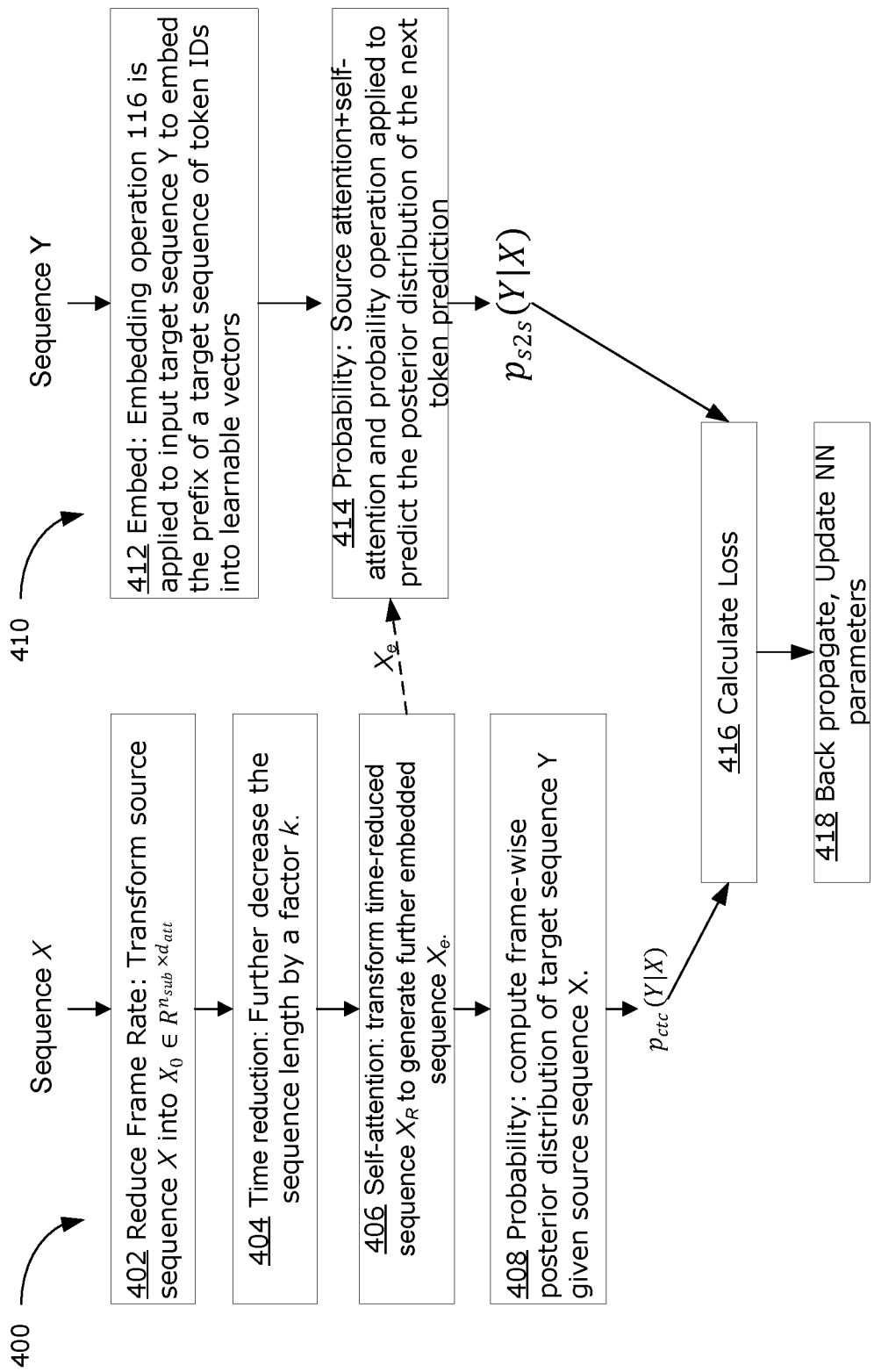
FIG. 4 is a flow diagram illustrating a training stage process of the ASR system of FIG. 1 according to an example embodiment.

In an example embodiment, the overall operation of ASR system 100 during a training stage can be described, with reference to FIG. 4, as:

Input: Speech frames sequence X and the target output labels Y

Output: Predicted output labels Ŷ

The following process 400 is performed by encoder NN 102:

Step 402: Subsample operation 108 ($x_0$=EncPre(X)) transforms the sequence X into sequence $X_0 \in R^{n_{sub} \times d_{att}}$ to reduce frame rate. Additionally, sequence $X_0$ is concatenated with (PE[1],PE[2], . . . ) as described in Equation (18) in the case where subsample operation 106 applies convolution subsampling.

Step 404: Time reduction operation 108 ($X_R$=TR($X_0$)) is applied to sequence $X_0$ to further decrease the sequence length by a factor k.

Step 406: Self-attention operation 110 ($X_e$=EncBody($X_R$)) is applied e times to the time-reduced sequence $X_R$ to generate further embedded sequence $X_e$.

Step 408: Probability operation 114 is applied to further embedded sequence $X_e$ steps to compute frame-wise posterior distribution $p_{ctc}$(Y|X) of target sequence Y given source sequence X.

The following process 410 is performed by decoder NN 104:

Step 412: Embedding operation 116 ($Y_0$[1:t−1]=DecPre(Y[1:t−1])) is applied to input target sequence Y to embed the previous context of a target sequence Y[1:t−1] of token IDs into learnable vectors $Y_0$[1:t−1]. Additionally, sequences $Y_0$ is concatenated with (PE[1], PE[2], . . . ) as described in Equation (18).

Step 414: The Source attention+self-attention operation 118 ($Y_d$[t]=DecBody($X_e$,$Y_0$[1:t−1])) and probability operation 120 ($Y_{post}$[1:t]=DecPost($Y_d$[1:t])) are applied to predict the posterior distribution $p_{s2s}$(Y|X) of the next token prediction $Y_{post}$[t] given $X_e$ and Y[1:t−1]. DecBody(.) is applied for d times.

Step 416: Loss function operation 122 is applied to calculate $L_{ASR}$=−α log $p_{s2s}$(Y|X)−(1−α)log $p_{ctc}$(Y|X)

Step 418: Back propagation is performed to update ASR system 100 parameters (e.g., weight matrices and bias vectors) using gradient descent with the objective of reducing the loss.

Steps 402 to 418 are repeated until a threshold loss criteria is reached or a defined maximum number of training iterations have been performed.

Once the ASR system 100 has been trained, it can be deployed to one or more devices and used for real-world speech recognition activities. As noted above, in some examples the ASR system 100 may be supplemented with a trained RNN lm network (not shown), and output labels Ŷ are predicted using Equation 20. Given a speech feature x from sequence X, and the previous predicted token, the next token is predicted using beam search, which combines the scores of S2S, CTC and RNN language model.

Figure 5:
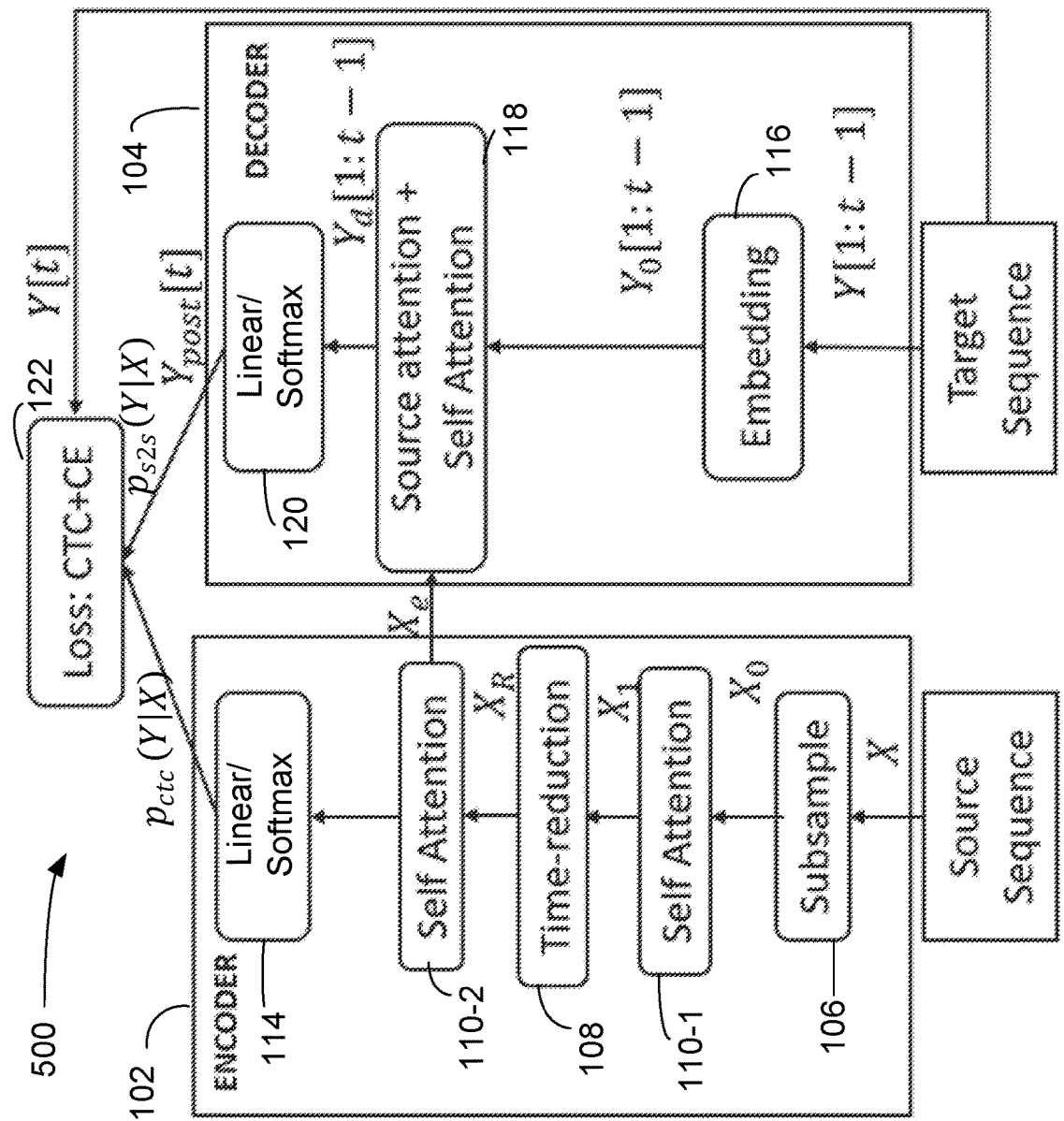
FIG. 5 is a block diagram showing a structure of an ASR system according to further example embodiments.

FIG. 5 illustrates a further example embodiment of a transformer based E2E ASR system 500 that is the same as ASR system 100 with the exception that in NN encoder 102, the time-reduction operation 108 is inserted into the stack of e transformer NN layers that are included in the self-attention operation 110. As shown in FIG. 5, the NN layers of time-reduction operation 108 have been divided into first and second sub-networks that implement a first self-attention operation 110-1 and a second self-attention operation 110-2, with time-reduction operation 108 located between the first and second self-attention operations. In an example embodiment, first self-attention operation 110-1 includes e1 layers, and second self-attention operation 110-2 includes e2 layers, where e=e1+e2. The NN encoder 102 of ASR system 500 can be represented as follows:

$X_0$=EncPre(X)

$X_1$=Enc1Body($X_0$)

$X_R$=TR($X_1$)

$X_e$=Enc2Body($X_R$)

Other the difference in number of layers, Enc1Body(.) and Enc2Body(.) each have a configuration the same as described above in respect of EncBody(.) In at least some scenarios, applying some self-attention layers prior to performing time reduction may improve the accuracy of the ASR system 500 relative to that of ASR system 100.

Figure 6:
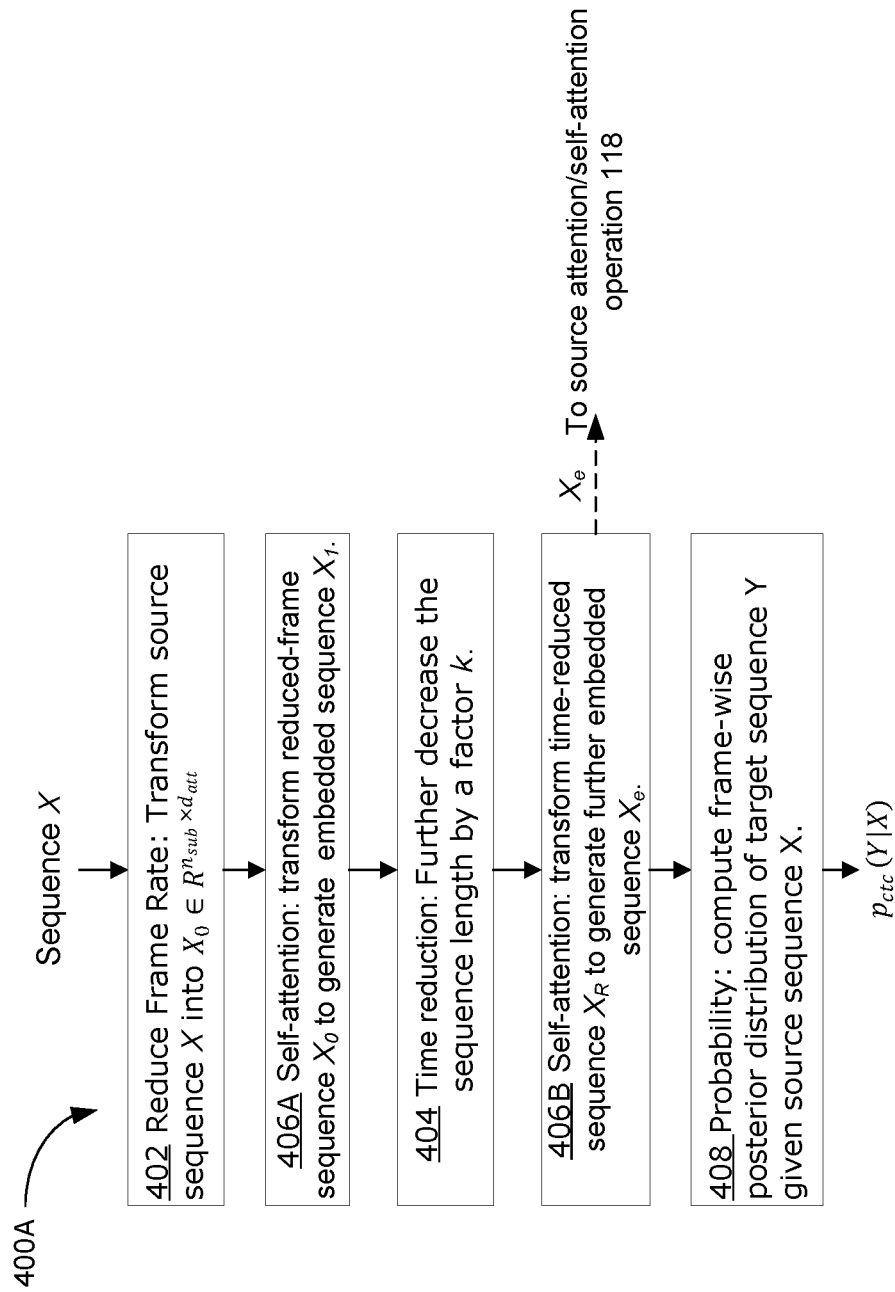
FIG. 6 is a flow diagram illustrating and encoder training stage process of the ASR system of FIG. 5 according to an example embodiment.

FIG. 6 is a flow diagram illustrating a modified encoder NN process 400A that is performed by the NN encoder 102 of ASR system 500. Encoder NN process 400A is the same as encoder NN process 400A with the exception that time reduction operation 108 is moved between layers of the self-attention operation, as illustrated in the following description:

Step 402: Subsample operation 108 ($x_0$=EncPre(X)) transforms the sequence X into sequence $X_0 \in R^{n_{sub} \times d_{att}}$ to reduce frame rate. Additionally, sequence $X_0$ is concatenated with (PE[1],PE[2], . . . ) as described in Equation (18) in the case where subsample operation 106 applies convolution subsampling.

Step 406A: First self-attention operation 110-1 ($X_1$=Enc1Body($X_0$)) is applied e1 times to the frame reduced sequence $X_0$ to generate further embedded sequence $X_1$.

Step 404: Time reduction operation 108 ($X_R$=TR($X_1$)) is applied to sequence $X_1$ to further decrease the sequence length by a factor k.

Step 406B: Second self-attention operation 110-2 ($X_e$=Enc2Body($X_R$)) is applied e2 times to the time-reduced sequence $X_R$ to generate further embedded sequence $X_e$.

Step 408: Probability operation 114 is applied to further embedded sequence $X_e$ steps to compute frame-wise posterior distribution $p_{ctc}$(Y|X) of target sequence Y given source sequence X.

Although growing in popularity, previously known transformer based ASR system in speech and semantic recognition fields have suffered by a $(1+m/l)^2$ decay in computing efficiency if the input sequence of length/is increased by m steps. Example embodiments described herein may in some cases alleviate the burden of computing efficiency in transformers by applying time reduction subnetworks. The proposed methods may in some applications reduce the compute cost of the encoder self-attention operation by $nk^2$ times where k is the frame rate reduction and n is the number of transformer layers after the time reduction sub-network layers. The described embodiments combine time-steps in transformers, which can be applied in speech and semantic fields that are not limited to text classification, and may for example also apply to neural machine translation, automatic speech recognition, speaker verification, and keyword spotting tasks.

Figure 7:
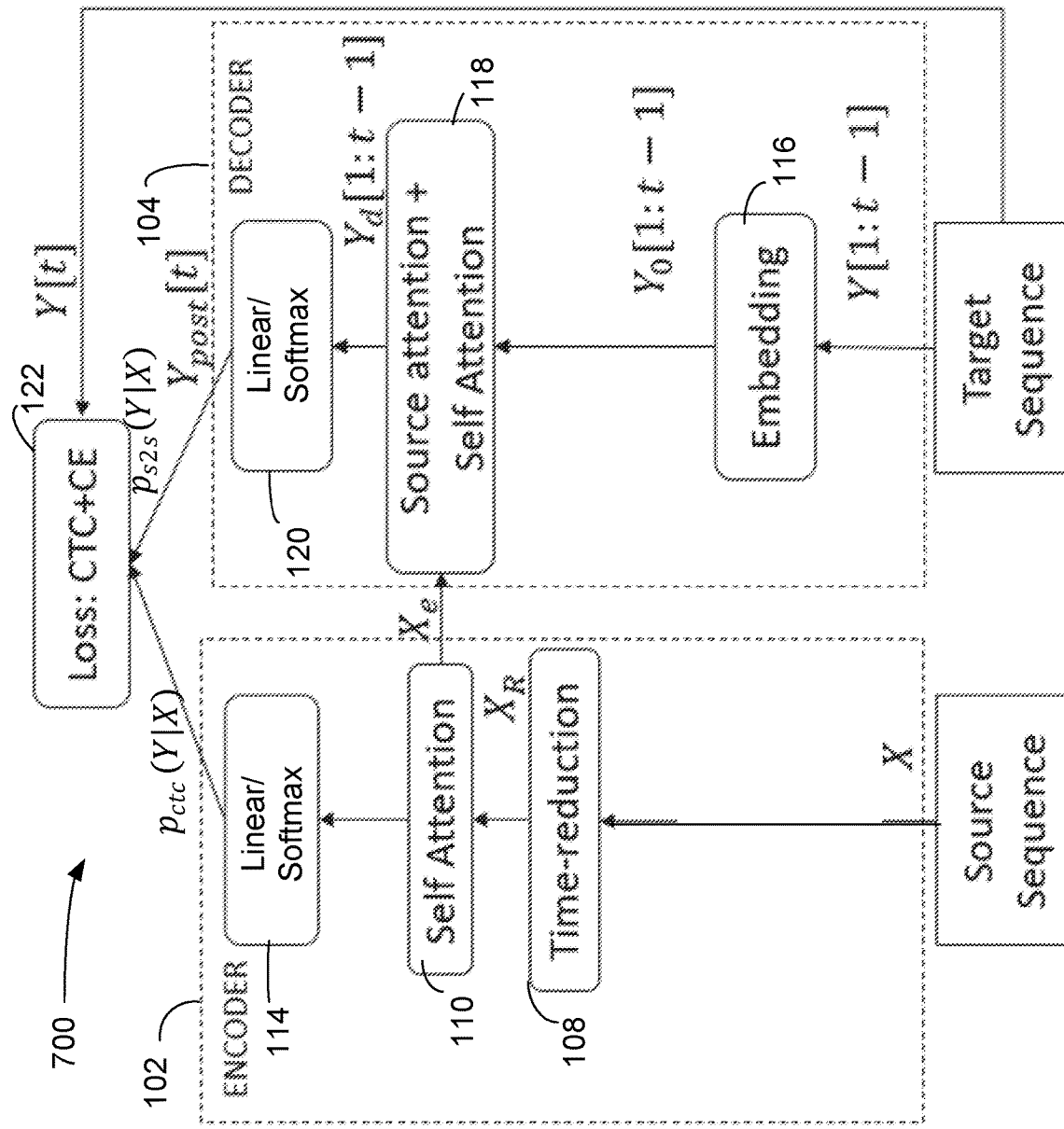
FIG. 7 is a block diagram showing a structure of an ASR system according to further example embodiments.

FIG. 7 illustrates a further example embodiment of a transformer based E2E ASR system 700 that is the same as ASR system 100 with the exception that subsample operation 106 is omitted in NN encoder 102, and the time-reduction operation 108 operates directly on input speech sequence X (e.g., $X_R$=EncPre(X)). In such examples, additional NN layers may be added to time-reduction operation 108 to provide further levels of frame concatenation.

Figure 8:
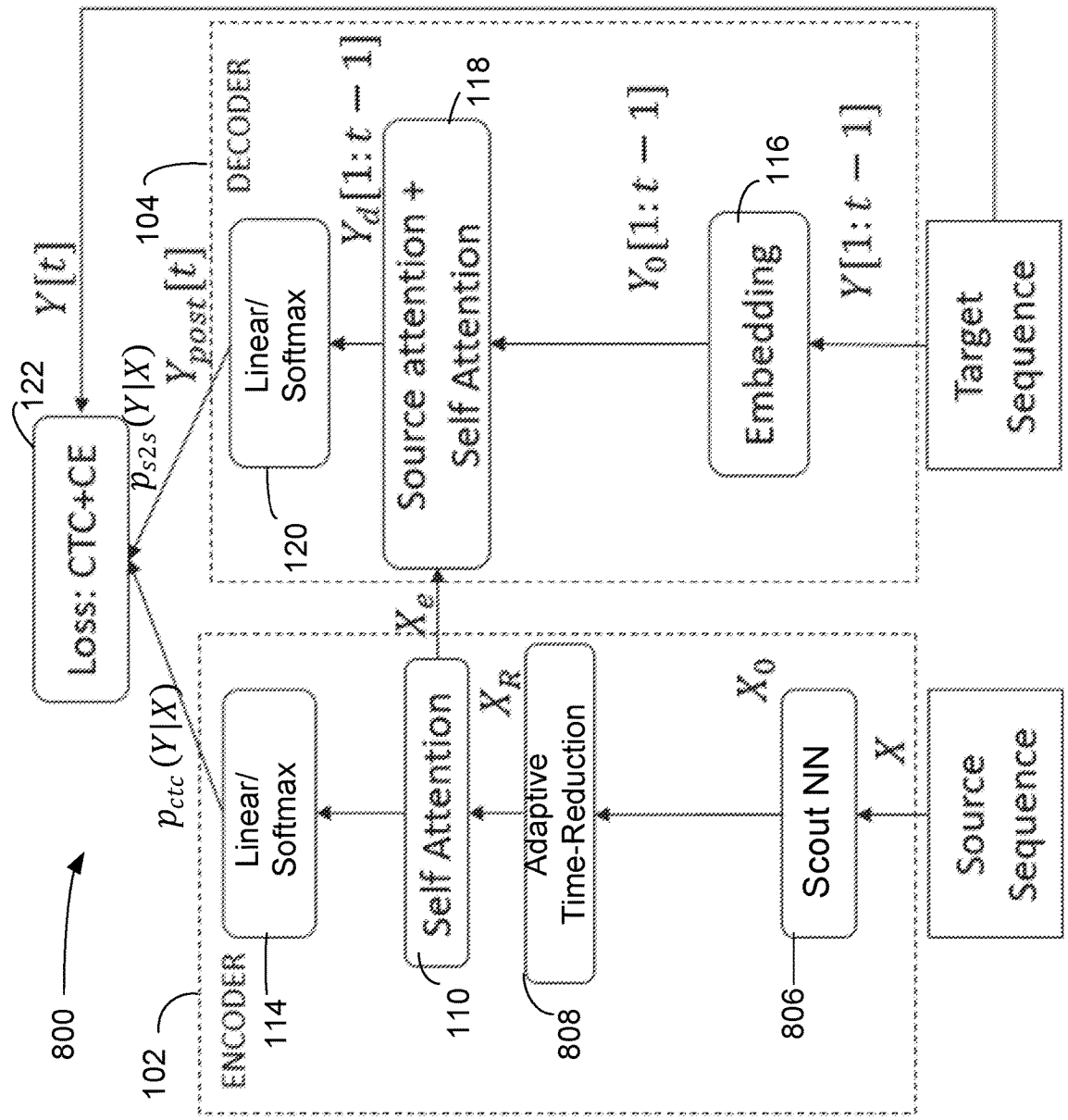
FIG. 8 is a block diagram showing a structure of an ASR system according to further example embodiments.

FIG. 8 illustrates a further example embodiment of a transformer based E2E ASR system 800 that is the same as ASR system 100 with the exception that subsample operation 106 is replaced with a scout NN 806 and time reduction operation 108 is replaced with an adaptive time reduction operation 808. The scout NN 806 (which may for example be implemented using a scout network such as that described in as described in C. Wang et al, Low Latency End-to-End Streaming Speech Recognition with a Scout Network, https://arxiv.org/abs/2003.10369 2020[12]), which is used to detect the word boundaries with the help of a forced aligner. Scout NN 806 determines the boundaries in a speech where a word starts and stops. Adaptive time-reduction operation 808 is configured to concatenate different numbers of frames with respect to the word boundaries that are output by the scout NN 806 network. This embodiment may require a separate neural network to apply adaptive time-reduction in the ASR system encoder.

Figure 9:
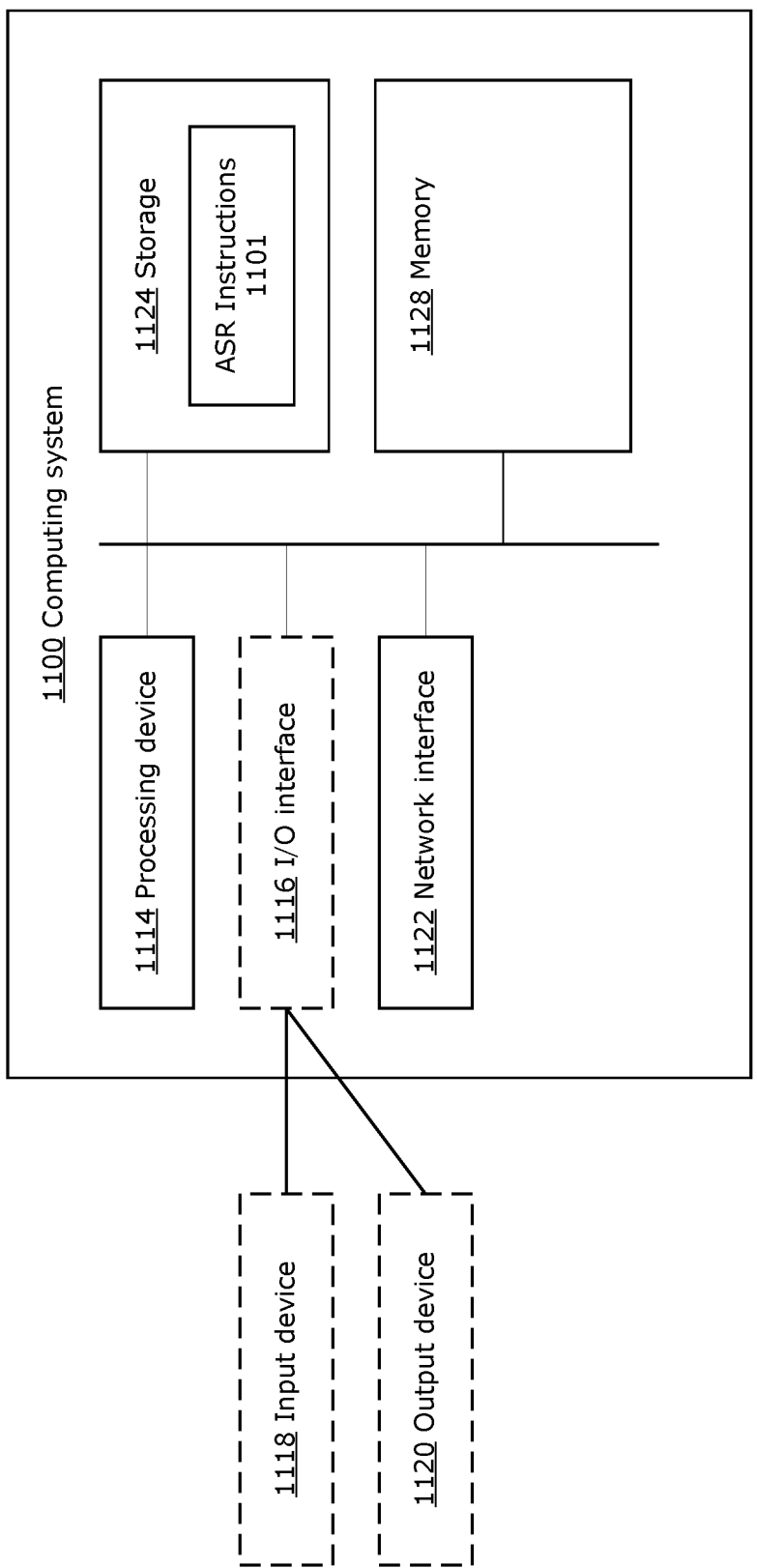
FIG. 9 is a block diagram showing a computing system that may be used to host an ASR system according to example embodiments.

FIG. 9 is a block diagram illustrating a simplified example implementation of a computing system 1100 suitable for implementing embodiments described herein. Examples of the present disclosure may be implemented in other computing systems, which may include components different from those discussed below. For example, in some examples, the computing system 1100 may be an artificial intelligence (AI) chip, an application specific integrated circuit (ASIC), or a field programmable gate array (FPGA) that includes circuitry to compress an embedding matrix in accordance with examples described herein.

Although FIG. 9 shows a single instance of each component, there may be multiple instances of each component in the computing system 1100.

The computing system 1100 may be, for example, a server side device comprising one or more servers located in a datacenter, or a cloud computing system, where an embedding matrix may be compressed in accordance with examples described herein. In some examples, the computing system 1100 may be a user device, such as a client device/terminal, user equipment/device (UE), mobile station (STA), smartphone, laptop, computer, tablet, smart device, machine type communications device, smart (or connected) vehicles, or consumer electronics device, among other possibilities. In some examples, the computing system 1100 may be an edge computing device.

The computing system 1100 may include one or more processing devices 114, such as a processor, a microprocessor, a digital signal processor, an application-specific integrated circuit (ASIC), a field-programmable gate array (FPGA), a dedicated logic circuitry, a dedicated artificial intelligence processor unit, a tensor processing unit, a neural processing unit, a hardware accelerator, or combinations thereof. The computing system 1100 may also include one or more optional input/output (I/O) interfaces 1116, which may enable interfacing with one or more optional input devices 1118 and/or optional output devices 1120.

In the example shown, the input device(s) 1118 (e.g., a keyboard, a mouse, a microphone, a touchscreen, and/or a keypad) and output device(s) 1120 (e.g., a display, a speaker and/or a printer) are shown as optional and external to the server. In other example embodiments, there may not be any input device(s) 1118 and output device(s) 1120, in which case the I/O interface(s) 1116 may not be needed.

The computing system 1100 may include one or more network interfaces 1122 for wired or wireless communication with other computing devices in a network. The network interface(s) 1122 may include wired links (e.g., Ethernet cable) and/or wireless links (e.g., one or more antennas) for intra-network and/or inter-network communications.

The computing system 1100 may also include one or more storage units 1124, which may include a mass storage unit such as a solid state drive, a hard disk drive, a magnetic disk drive and/or an optical disk drive.

The computing system 1100 may include one or more memories 128, which may include a volatile or non-volatile memory (e.g., a flash memory, a random access memory (RAM), and/or a read-only memory (ROM)). The non-transitory memory(ies) 1128 may store instructions for execution by the processing device(s) 1114, such as to carry out example embodiments described in the present disclosure. The memory(ies) 1128 may include other software instructions, such as for implementing an operating system and other applications/functions.

In some example embodiments, the storage unit(s) 1124 (or memory(ies) 1128) may include software instructions 1101 for execution by the processing device 1114 to implement ASR system 100, 500, 700 or 800. In some example embodiments, the memory(ies) 1128 may alternatively or additionally include software instructions for execution by the processing device 1114 implement ASR system 100, 500, 700 or 800. In some example embodiments, the computing system 1100 may additionally or alternatively execute instructions from an external memory (e.g., an external drive in wired or wireless communication with the server) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Certain adaptations and modifications of the described embodiments can be made. Therefore, the above discussed embodiments are considered to be illustrative and not restrictive.

The content of all published papers identified in this disclosure are incorporated herein by reference.

What is claimed is:

1. A computer implemented method for automatic speech recognition (ASR) using a transformer-based ASR system, comprising:

obtaining a first speech sequence representative of an acoustic source, that comprises a first set of speech frame feature vectors that each represent a respective speech frame that corresponds to a respective time step;

processing the first speech sequence, using a time reduction operation of an encoder neural network (NN), into a second speech sequence that comprises a second set of speech frame feature vectors that each concatenate information from a respective plurality of the speech frame feature vectors included in the first set, wherein the second speech sequence includes fewer speech frame feature vectors than the first speech sequence;

transforming the second speech sequence, using a self-attention operation of the encoder NN, into a third speech sequence that comprises a third set of speech frame feature vectors;
processing the third speech sequence, using a probability operation of the encoder NN, to predict a sequence of first labels corresponding to the third set of speech frame feature vectors; and
processing the third speech sequence using a decoder NN to predict a sequence of second labels corresponding to the third set of speech frame feature vectors,
wherein the method comprises:
during a training stage of the encoder NN and the decoder NN:
computing a loss function based on the predicted sequence of first labels and the predicted sequence of second labels; and
performing back propagation using gradient descent to update learnable parameters of the decoder NN and the encoder NN to reduce the loss function; and
during an inference stage:
computing a sequence of labels for the third speech sequence based on the predicted sequence of first labels and the predicted sequence of second labels.

2. The method of claim 1, wherein obtaining the first speech sequence comprises:
obtaining an input speech sequence that comprises an input set of speech frame feature vectors that each represent a respective speech frame that corresponds to a respective time step; and
processing the input speech sequence, using a subsampling operation of the encoder NN, into the first speech sequence, wherein the first speech sequence includes fewer speech frame feature vectors than the input speech sequence.

3. The method of claim 1 wherein the time reduction operation is performed using one or more linear NN layers of the encoder NN.

4. The method of claim 1 wherein obtaining the first speech sequence comprises:
obtaining an initial speech sequence that comprises an initial set of speech frame feature vectors that each represent a respective speech frame that corresponds to a respective time step; and
processing the initial speech sequence, using a further self-attention operation of the encoder NN that precedes the time reduction operation, into the first speech sequence.

5. The method of claim 4, wherein obtaining the initial speech sequence comprises:
obtaining an input speech sequence that comprises an input set of speech frame feature vectors that each represent a respective speech frame that corresponds to a respective time step; and
processing the input speech sequence, using a subsampling operation of the encoder NN, into the initial speech sequence, wherein the initial speech sequence includes fewer speech frame feature vectors than the input speech sequence.

6. The method of claim 4 wherein the self-attention operation and the further self-attention operation are each performed by respective sub-networks of self-attention layers.

7. The method of claim 6 comprising using a respective number of self-attention layers for each of the self-attention operation and the further self-attention operation based on obtained hyperparameters.

8. An automatic speech recognition computing system comprising:
a storage storing executable instructions; and
a processing device in communication with the storage, the processing device configured to execute the instructions to cause the computing system to:
obtain a first speech sequence representative of an acoustic source, that comprises a first set of speech frame feature vectors that each represent a respective speech frame that corresponds to a respective time step;
process the first speech sequence, using a time reduction operation, into a second speech sequence that comprises a second set of speech frame feature vectors that each concatenate information from a respective plurality of the speech frame feature vectors included in the first set, wherein the second speech sequence includes fewer speech frame feature vectors than the first speech sequence;
transform the second speech sequence, using a self-attention operation, into a third speech sequence that comprises a third set of speech frame feature vectors;
process the third speech sequence, using a probability operation, to predict a sequence of first labels corresponding to the third set of speech frame feature vectors; and
process the third speech sequence using a further self-attention operation and a further probability operation to predict a sequence of second labels corresponding to the third set of speech frame feature vectors,
wherein the processing device is configured to execute the instructions to:
cause the computing system to implement a encoder neural network (NN) and a decoder NN, wherein the time reduction operation, self-attention operation and probability operation are each performed using respective sub-networks of the encoder NN and the further self-attention operation and further probability operation are each performed using respective sub-networks of the decoder NN;
cause the computing system to, during a training stage of the encoder NN and the decoder NN:
compute a loss function based on the predicted sequence of first labels and the predicted sequence of second labels; and
perform back propagation using gradient descent to update learnable parameters of the decoder NN and the encoder NN to reduce the loss function; and
cause the computing system to, during an inference stage:
compute a sequence of labels for the third speech sequence based on the predicted sequence of first labels and the predicted sequence of second labels.

9. The system of claim 8 wherein the processing device is configured to execute the instructions to cause the computing system to obtain the first speech sequence by:
obtaining an input speech sequence that comprises an input set of speech frame feature vectors that each represent a respective speech frame that corresponds to a respective time step; and
process the input speech sequence, using a subsampling operation, into the first speech sequence, wherein the first speech sequence includes fewer speech frame feature vectors than the input speech sequence.

10. The system of claim 8 wherein the processing device is configured to execute the instructions to cause the computer system to obtain the first speech sequence by:

obtaining an initial speech sequence that comprises an initial set of speech frame feature vectors that each represent a respective speech frame that corresponds to a respective time step; and processing the initial speech sequence, using a further self-attention operation of the encoder NN that precedes the time reduction operation, into the first speech sequence.

11. The system of claim 10 wherein the processing device is configured to execute the instructions to cause the computer system to obtain the initial speech sequence by:

obtaining an input speech sequence that comprises an input set of speech frame feature vectors that each represent a respective speech frame that corresponds to a respective time step; and processing the input speech sequence, using a subsampling operation of the encoder NN, into the initial speech sequence, wherein the initial speech sequence includes fewer speech frame feature vectors than the input speech sequence.

12. The system of claim 10 wherein the processing device is configured to execute the instructions to cause the computer system to use respective sub-networks of self-attention layers to perform the self-attention operation and the further self-attention operation.

13. The system of claim 12 wherein the processing device is configured to execute the instructions to cause the computer system to use a respective number of self-attention layers for each of the self-attention operation and the further self-attention operation based on obtained hyperparameters.

14. A non-transitory computer readable medium that stores computer instructions that, when executed by a processing device of a computer system cause the computer system to:

obtain a first speech sequence representative of an acoustic source, that comprises a first set of speech frame feature vectors that each represent a respective speech frame that corresponds to a respective time step;

process the first speech sequence, using a time reduction operation of an encoder NN, into a second speech sequence that comprises a second set of speech frame feature vectors that each concatenate information from a respective plurality of the speech frame feature vectors included in the first set, wherein the second speech sequence includes fewer speech frame feature vectors than the first speech sequence;

transform the second speech sequence, using a self-attention operation of the encoder NN, into a third speech sequence that comprises a third set of speech frame feature vectors;

process the third speech sequence, using a probability operation of the encoder NN, to predict a sequence of first labels corresponding to the third set of speech frame feature vectors; and process the third speech sequence using a decoder NN to predict a sequence of second labels corresponding to the third set of speech frame feature vectors; and wherein the stored computer instructions, when executed by a processing device of a computer system, further cause the computer system to:

during a training stage of the encoder NN and the decoder NN:

compute a loss function based on the predicted sequence of first labels and the predicted sequence of second labels; and perform back propagation using gradient descent to update learnable parameters of the decoder NN and the encoder NN to reduce the loss function; and during an inference stage:

compute a sequence of labels for the third speech sequence based on the predicted sequence of first labels and the predicted sequence of second labels.

15. An automated speech recognition system comprising:

an encoder neural network configured to process a first speech sequence representative of an acoustic source, that comprises a first set of speech frame feature vectors that each represent a respective speech frame that corresponds to a respective time step, the encoder neural network implementing:

a time reduction operation transforming the first speech sequence into a second speech sequence that comprises a second set of speech frame feature vectors that each concatenate information from a respective plurality of the speech frame feature vectors included in the first set, wherein the second speech sequence includes fewer speech frame feature vectors than the first speech sequence;

a self-attention operation transforming the second speech sequence, using a self-attention mechanism, into a third speech sequence that comprises a third set of speech frame feature vectors;

a probability operation predicting a sequence of first labels corresponding to the third set of speech frame feature vectors; and a decoder neural network processing the third speech sequence to predict a sequence of second labels corresponding to the third set of speech frame feature vectors, wherein during a training stage of the encoder neural network and the decoder neural network:

a loss function is computed based on the predicted sequence of first labels and the predicted sequence of second labels; and back propagation is performed using gradient descent to update learnable parameters of the decoder NN and the encoder NN to reduce the loss function; and during an inference stage of the encoder neural network and the decoder neural network, compute a sequence of labels for the third speech sequence based on the predicted sequence of first labels and the predicted sequence of second labels.

* * * * *

UNITED STATES PATENT AND TRADEMARK OFFICE
CERTIFICATE OF CORRECTION

| | |
|---|---|
| PATENT NO. | : 11,715,461 B2 |
| APPLICATION NO. | : 17/076794 |
| DATED | : August 1, 2023 |
| INVENTOR(S) | : Md Akmal Haidar and Chao Xing |

It is certified that error appears in the above-identified patent and that said Letters Patent is hereby corrected as shown below:

In the Specification

Column 8, Lines 25-26, Equation 8 should read as:

$$H_h = \text{att}(QW_h^q, KW_h^k, VW_h^v)$$

Signed and Sealed this
Third Day of October, 2023

Katherine Kelly Vidal
*Director of the United States Patent and Trademark Office*